(12) United States Patent
Yu et al.

(10) Patent No.: US 9,854,218 B2
(45) Date of Patent: Dec. 26, 2017

(54) ELECTRONIC SYSTEM AND IMAGE PROCESSING METHOD

(71) Applicant: SAMSUNG ELECTRONICS CO., LTD., Suwon-si (KR)

(72) Inventors: Jaewon Yu, Yongin-si (KR); Ki-Chrl Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/966,002

(22) Filed: Dec. 11, 2015

(65) Prior Publication Data

US 2016/0241830 A1 Aug. 18, 2016

(30) Foreign Application Priority Data

Feb. 13, 2015 (KR) ........................ 10-2015-0022369

(51) Int. Cl.
*H04N 9/73* (2006.01)

(52) U.S. Cl.
CPC .................................. *H04N 9/735* (2013.01)

(58) Field of Classification Search
CPC .......... H04N 9/73; H04N 9/735; H04N 5/225; H04N 5/76
USPC .................. 348/223.1–229.1, 361, 371–376
See application file for complete search history.

(56) References Cited

U.S. PATENT DOCUMENTS

| 7,646,976 | B2 * | 1/2010 | Kurosawa | G02B 7/08 396/213 |
| 8,035,584 | B2 | 10/2011 | Jung | |
| 8,493,514 | B2 | 7/2013 | Choi et al. | |
| 8,941,757 | B2 | 1/2015 | Seok et al. | |
| 8,970,468 | B2 * | 3/2015 | Albrecht | G09G 5/02 345/101 |
| 8,982,236 | B2 | 3/2015 | Furuta | |
| 9,191,640 | B1 * | 11/2015 | Huang | H04N 9/73 |
| 2008/0170004 | A1 | 7/2008 | Jung | |
| 2009/0021647 | A1 | 1/2009 | Choi et al. | |
| 2010/0214434 | A1 | 8/2010 | Kim et al. | |
| 2013/0128073 | A1 | 5/2013 | Seok et al. | |
| 2014/0168463 | A1 | 6/2014 | Tamura | |
| 2014/0232901 | A1 | 8/2014 | Furuta | |

FOREIGN PATENT DOCUMENTS

| KR | 100581526 B1 | 5/2006 |
| KR | 1020060089094 A | 8/2006 |
| KR | 101143834 B1 | 7/2012 |

* cited by examiner

*Primary Examiner* — Yogesh Aggarwal
(74) *Attorney, Agent, or Firm* — Sughrue Mion, PLLC

(57) ABSTRACT

An image processing method includes receiving an image including a plurality of pixels; compensating a color temperature of at least one pixel included in the image according to a color of the at least one pixel; and outputting the image according to a result of the compensating, wherein the compensating includes: measuring a color temperature of the image; and applying a color temperature compensation value to the at least one pixel based on the measured color temperature and the color of the at least one pixel.

19 Claims, 13 Drawing Sheets

| Color temperature | Color | Compensation value of color temperature |
|---|---|---|
| 4000K ~ 5000K | Yellow | −100K |
| 4000K ~ 5000K | Red | +100K |
| 5000K ~ 6000K | Yellow | −200K |
| ⋮ | ⋮ | ⋮ |

| Outdoor/Indoor | Luminance | Color temperature | Color | Compensation value of color temperature |
|---|---|---|---|---|
| Outdoor | A Lux | 4000K ~ 5000K | Yellow | -80K |
| Outdoor | B Lux | 4000K ~ 5000K | Yellow | -90K |
| Indoor | A Lux | 5000K ~ 6000K | Yellow | -100K |
| Indoor | B Lux | 4000K ~ 5000K | Yellow | -110K |
| Outdoor | C Lux | 5000K ~ 6000K | Yellow | -200K |
| Indoor | D Lux | 4000K ~ 5000K | Red | 100K |
| ... | ... | ... | ... | ... |

ELECTRONIC SYSTEM AND IMAGE PROCESSING METHOD

CROSS-REFERENCE TO RELATED APPLICATION

This application claims priority from Korean Patent Application No. 10-2015-0022369, filed on Feb. 13, 2015, in the Korean Intellectual Property Office, the disclosure of which is hereby incorporated in its entirety by reference.

BACKGROUND

Systems, apparatuses, and methods consistent with exemplary embodiments relate to an electronic system and an image processing method, and more particularly, to an electronic system including an image signal processing device compensating a white balance of an image and an image processing method thereof.

As a digital technology develops, a digital camera capable of shooting an image without a film is being rapidly developed.

The core of a digital camera may include an image sensor unit that captures an image, or an image processing unit that processes a digital signal. Due to a difference in image quality and a color of a digital camera and those of a film camera, a study and an improvement in an image processing field of the digital camera are needed. In particular, a color processing for a natural color reproduction is the core in an image processing field.

When shooting the same subject using a digital image device such as a digital still camera, a digital video camera, etc., an apparent color shot becomes different depending on various light source conditions such as a solar light, cloudy weather, white lightning, fluorescent lightning, etc. Since a human eye adapts itself to a light source to feel white as white, the human eye does not feel unnaturalness. However, in a digital image device, color temperature sufficiently responds to KGB components included in different light sources. If the color temperature is high, the color is reproduced as white tinged with blue. If the color temperature is low, the color is reproduced as white tinged with red.

Thus, even in the case that color temperature is changed, it is desirable to maintain a white balance. To achieve this, it is controlled such that in an achromatic color subject, an RGB ratio is always constant or color difference signals R-Y, B-Y become always substantially zero. Performance of that function is called a white balance correction. That is, in white tinged with blue, gain of R (red) is increased more than gain of B (blue), and in white tinged with red, gain of B (blue) is increased more than gain of R (red).

SUMMARY

One or more exemplary embodiments provide an image processing method. The image processing method may include receiving an image including a plurality of pixels; compensating a color temperature of at least one pixel included in the image according to a color of the at least one pixel; and outputting the image according to a result of the compensating, wherein the compensating includes: measuring a color temperature of the image; and applying a color temperature compensation value to the at least one pixel based on the measured color temperature and the color of the at least one pixel.

The applying may include: analyzing the color of the at least one pixel; determining whether the color of the at least one pixel exists in a look up table; and in response to determining that the color of the at least one pixel exists in the look up table, determining the color temperature compensation value corresponding to the color and the measured color temperature of the at least one pixel by using the look up table and applying the determined color temperature compensation value to the at least one pixel.

A color temperature of the at least one pixel may be determined as a value obtained by compensating the measured color temperature of the at least one pixel based on the color temperature compensation value.

The applying the color temperature compensation value may further include: in response to determining that the color of the at least one pixel does not exist in the look up table, determining the measured color temperature of the at least one pixel as a color temperature of the at least one pixel.

The applying the color temperature compensation value may further include in response to determining that the color of the at least one pixel does not exist in the look up table, calculating the color temperature compensation value corresponding to the color of the at least one pixel; and applying the calculated color temperature compensation value to the at least one pixel.

The calculating may include calculating the color temperature compensation value based on color temperature compensation values of at least two colors stored in the look up table and based on a location of the color of the at least one pixel with respect to the two colors stored in the look up table.

In response to determining that the color of the at least one pixel does not exist in the look up table, the color temperature compensation value corresponding to the color of the at least one pixel may be determined based on the color temperature compensation values of the at least two colors stored in the look up table.

The applying the color temperature compensation value may further include determining whether the at least one pixel is a last pixel among the plurality of pixels of the image, and in response to determining that the at least one pixel is not the last pixel, receiving another pixel among the plurality of pixels of the image and compensating a color temperature of the another pixel according to a color of the another pixel.

The compensating may further include performing at least one of: measuring brightness of the at least one pixel; and determining whether the image is captured indoors or outdoors.

The applying the color temperature compensation value may include applying the color temperature compensation value to the at least one pixel based on at least one from among the measured color temperature of the at least one pixel, the color of the at least one pixel, the measured brightness of the at least one pixel, and whether the image is captured indoors or outdoors.

The image processing method may further include prior to performing the compensating, performing a preprocessing operation on the image; and after performing the compensating, performing a post-processing operation on the image.

According to an aspect of another exemplary embodiment, there is an electronic system including: a camera configured to capture an image including a plurality of pixels; a color temperature measurer configured to measure a color temperature of at least one pixel of the image; a look up table configured to store a color temperature compensation value according to the color temperature and a color of the at least one pixel; and a white balance adjuster configured to compensate the color temperature of the at least one pixel of the image by using the look up table.

The white balance adjuster may be further configured to apply the color temperature compensation value to the at least one pixel of the image.

The look up table may be further configured to store the color temperature compensation value based on at least one of brightness of an environment in which the image is measured and whether the image is captured indoors or outdoors.

The white balance adjuster may be further configured to compensate the color temperature of the at least one pixel of the image based on the at least one of the brightness of the environment in which the image is measured and whether the image is captured indoors or outdoors, by using the look up table.

According to an aspect of still another exemplary embodiment, there is provided an image signal processing apparatus including: a preprocessing module configured to perform a preprocessing operation on an image; a color temperature measurer configured to measure a color temperature of at least one pixel of the image; a white balance adjuster configured to compensate the color temperature of the at least one pixel of the image based on a color and the color temperature of the at least one pixel; and a post-processing module configured to perform a post-processing operation on the compensated image.

The image signal processing apparatus may further include a look up table configured to store a color temperature compensation value based on the color and the color temperature of the at least one pixel.

The white balance adjuster may be further configured to correct a white balance of the at least one pixel by using the look up table.

The white balance adjuster may be further configured to apply the color temperature compensation value to the at least one pixel of the image.

The white balance adjuster may be further configured to compensate the color temperature of the at least one pixel of the image based on brightness of the at least one pixel.

BRIEF DESCRIPTION OF THE FIGURES

The above and/or other aspects will become more apparent by describing certain exemplary embodiments with reference to the accompanying drawings.

FIG. 2 is a drawing illustrating a look up table of FIG. 1 in accordance with an exemplary embodiment.

FIG. 8 is a drawing illustrating a look up table of FIG. 1 in accordance with another exemplary embodiment.

DETAILED DESCRIPTION

Figure 1:
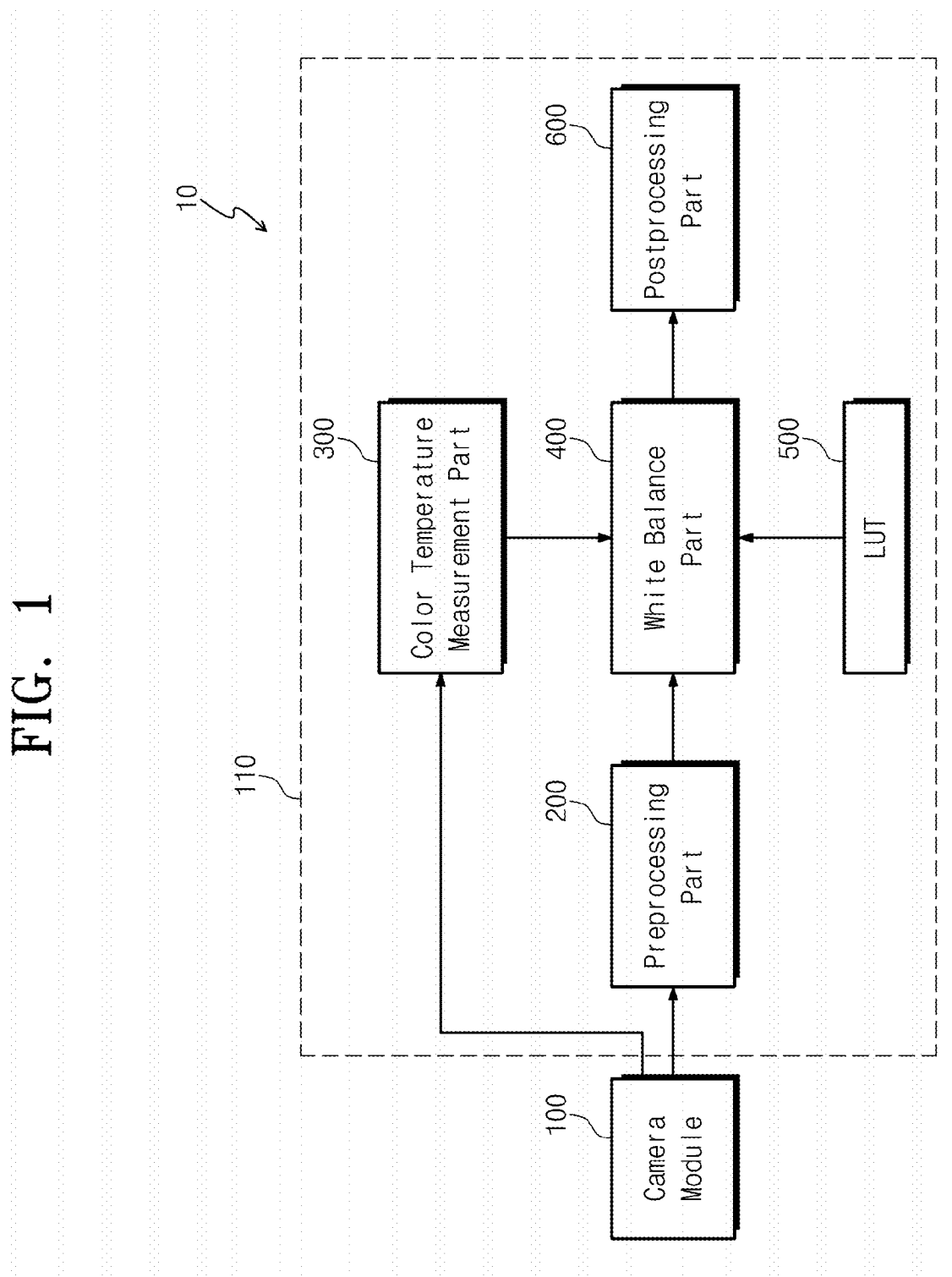
FIG. 1 is a block diagram of an electronic system in accordance with an exemplary embodiment.

Reference will now be made in detail to exemplary embodiments, examples of which are illustrated in the accompanying drawings. The exemplary embodiments are merely provided to fully describe the present inventive concept to one of ordinary skill in the art to which the present inventive concept pertains. As the present inventive concept allows for various changes and numerous exemplary embodiments, particular exemplary embodiments will be illustrated in the drawings and described in detail in the written description. However, this is not intended to limit the present inventive concept to particular modes of practice, and it will be understood that all changes, equivalents, and substitutes that do not depart from the spirit and technical scope of the present inventive concept are encompassed in the present inventive concept. Like reference numerals refer to like elements throughout. Sizes of components in the drawings may be exaggerated for clarity. As used herein, the term "and/or" includes any and all combinations of one or more of the associated listed items. Expressions such as "at least one of," when preceding a list of elements, modify the entire list of elements and do not modify the individual elements of the list.

The terms used in the present specification are merely used to describe particular exemplary embodiments, and are not intended to limit the present inventive concept. An expression used in the singular encompasses the expression of the plural, unless it has a clearly different meaning in the context. In the present specification, it is to be understood that the terms such as "including", "having", and "comprising" are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While such terms as "first," "second," etc., may be used to describe various components, such components must not be limited to the above terms. The above terms are used only to distinguish one component from another. For example, within the scope of the present inventive concept, a first component may be referred to as a second component, and vice versa.

Unless defined otherwise, all terms used in the description including technical or scientific terms have the same meaning as commonly understood by one of ordinary skill in the art to which the present inventive concept pertains. It will be further understood that terms, such as those defined in commonly used dictionaries, should be interpreted as having a meaning that is consistent with their meaning in the context of the related art, and should not be interpreted as having ideal or excessively formal meanings unless it is clearly defined in the specification.

FIG. 1 is a block diagram of an electronic system in accordance with an exemplary embodiment.

Referring to FIG. 1, an electronic system 10 may include a camera module (or camera) 100 and an image signal processing device 110. The image signal processing device 110 may include a preprocessing part 200, a color temperature measurement part (or color temperature measurer) 300, a white balance part (or white balance adjuster) 400, a look up table (LUT) 500, and a post-processing part 600.

The camera module 100 may include a portable camera and/or a shooting device built in a portable terminal, a notebook, a computer, etc.

The camera module 100 can shoot a subject and convert an image shot into an electrical signal. The camera module 100 may include a shooting lens into which a light reflected from the subject enters, a color filter for filtering a light of a specific wavelength range among lights that enter the shooting lens and an image sensor for converting filtered light into an electrical signal. The camera module 100 may generate a digital image including a plurality of pixels. Each pixel may include red, green and blue data.

The preprocessing part 200 performs a preprocessing operation on an image received from the camera module 100. The preprocessing operation may include a series of data processing procedure that is performed before a white balance correction is performed. The preprocessing part 200 can illustratively perform a lens shading correction (LSC), a chromatic aberration correction, a Gamma correction and a color interpolation of an image. However, the preprocessing part 200 is not limited thereto and the preprocessing part 200 may perform parts of the processing procedures described as an illustration and the remaining part may be performed in the post-processing part 600.

The color temperature measurement part 300 analyzes an image to measure a color temperature of the image. The color temperature measurement part 300 can convert the measured color temperature of the image into an electrical signal. In FIG. 1, the color temperature measurement part 300 analyzes an image received from the camera module 100 to measure a color temperature of the image. In another exemplary embodiment, the color temperature measurement part 300 may analyze an image preprocessed in the preprocessing part 200 to measure a color temperature of the image.

The white balance part 400 can correct a white balance of preprocessed image. The white balance part 400 can correct a white balance of an image with reference to color temperature information measured in the color temperature measurement part 300 and the look up table (LUT) 500. Specifically, the white balance part 400 analyzes an image by each pixel to determine a color of each pixel. The white balance part 400 reads out a color temperature compensation value according to a color of each pixel from the LUT 500 to compensate a color temperature of corresponding pixels. The white balance part 400 can apply a color temperature compensation value according to color to each pixel of the image.

In an exemplary embodiment, the LUT 500 stores a color temperature compensation value according to a color temperature of an image and a color of each pixel. The LUT 500 may be stored in a nonvolatile memory.

The post-processing part 600 performs a post-processing operation on a color temperature compensated image. The post-processing operation may include a series of data processing procedure that is performed after a white balance correction is performed. The post-processing part 600 can perform noise attenuation. However, the post-processing part 600 is not limited thereto and can perform a part of processing procedures to be performed in the preprocessing part 200.

Since an RGB characteristic of each channel of an image sensor of the camera module 100 is different from a human eye, a color temperature according to color may appear different. According to an electronic system including an image signal processing device in accordance with exemplary embodiments, a color reproduction rate of an image can be increased by compensating a suitable color temperature in accordance with color at every pixel.

FIG. 2 is a drawing illustrating a look up table of FIG. 1 in accordance with an exemplary embodiment.

Referring to FIGS. 1 and 2, a color temperature and a color temperature compensation value according to color are stored in the LUT 500.

In the case where a color temperature of a measured image belongs to a range of 4000 K~5000 K and a color of a first pixel to be compensated with respect to the color temperature is yellow, a color temperature compensation value may be −100 K. The white balance part 400 can process a color temperature being applied to the first pixel by a value obtained by subtracting 100 K from the color temperature of the measured image.

In the case where a color temperature of a measured image belongs to a range of 4000 K~5000 K and a color of a second pixel to be compensated with respect to the color temperature is red, a color temperature compensation value may be 100 K. The white balance part 400 can process a color temperature being applied to the second pixel by a value obtained by adding 100 K to the color temperature of the measured image.

As described above, even if a color temperature of the measured image is the same or is within the same range, a different color temperature compensation value may be applied if colors of the first and second pixels are different from each other.

In the case where a color temperature of a measured image belongs to a range of 5000 K~6000 K and a color of a third pixel to be compensated with respect to the color temperature is yellow, a color temperature compensation value may be −200 K. The white balance part 400 can process a color temperature being applied to the third pixel by a value obtained by subtracting 200 K from the color temperature of the measured image.

As described above, even if colors of the first and third pixels are the same, a different color temperature compensation value may be applied if color temperatures of the measured image are different from each other.

Figure 3:
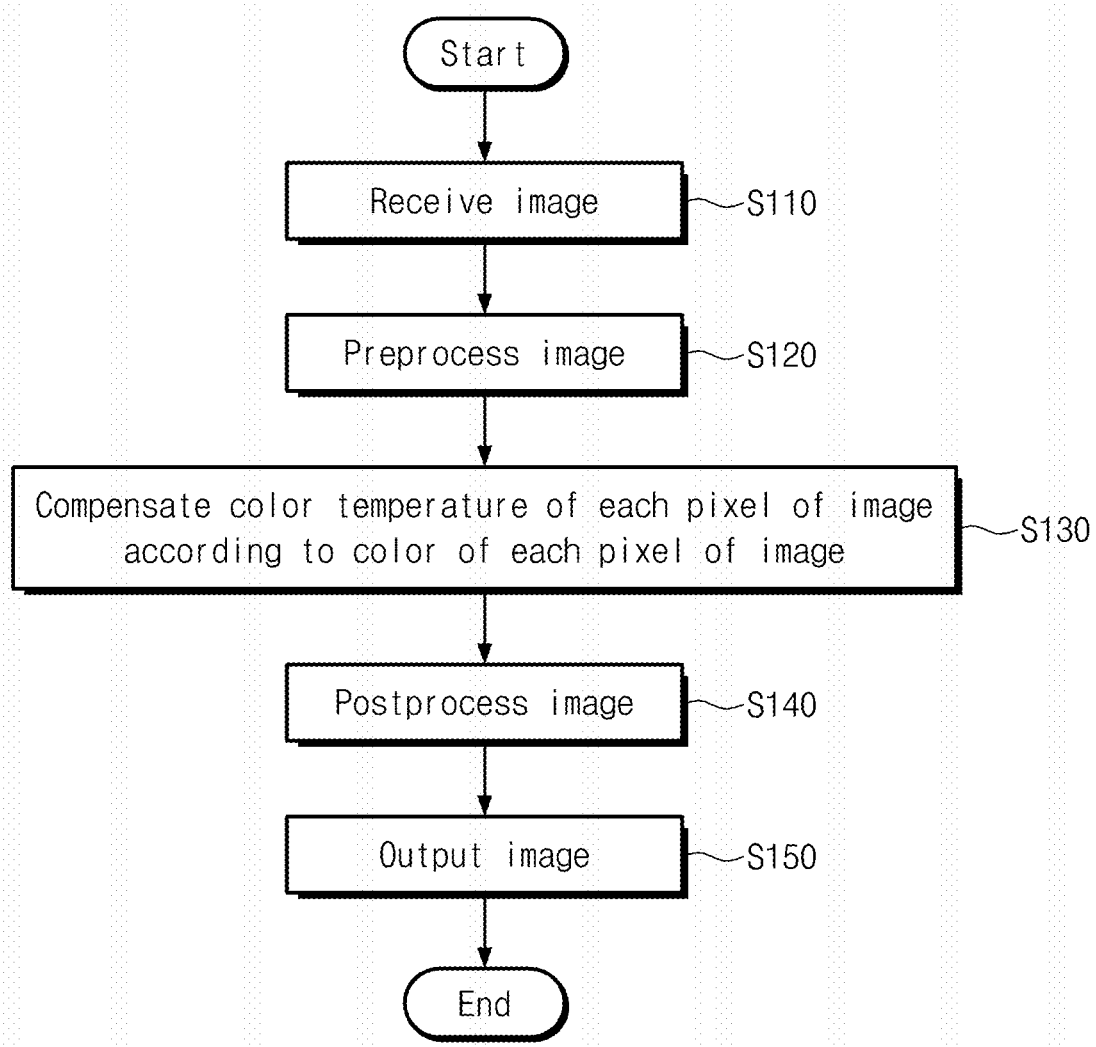
FIG. 3 is a flowchart illustrating an image processing method of an image signal processing device in accordance with an exemplary embodiment.

FIG. 3 is a flowchart illustrating an image processing method of an image signal processing device in accordance with an exemplary embodiment.

Referring to FIGS. 1 and 3, an image shot in the camera module 100 is received (S110). Next, a preprocessing operation is performed on the image (S120).

A color temperature of each pixel is compensated according to a color of each pixel of the image (S130). A color temperature compensation is performed on each pixel of the image.

A post-processing operation is performed on the color temperature compensated image (S140). The post-processed image is output (S150).

According to an image processing method of an image signal processing device in accordance with an exemplary embodiment, a color reproduction rate of an image can be increased by suitably compensating a color temperature in accordance with color at each pixel.

Figure 4:
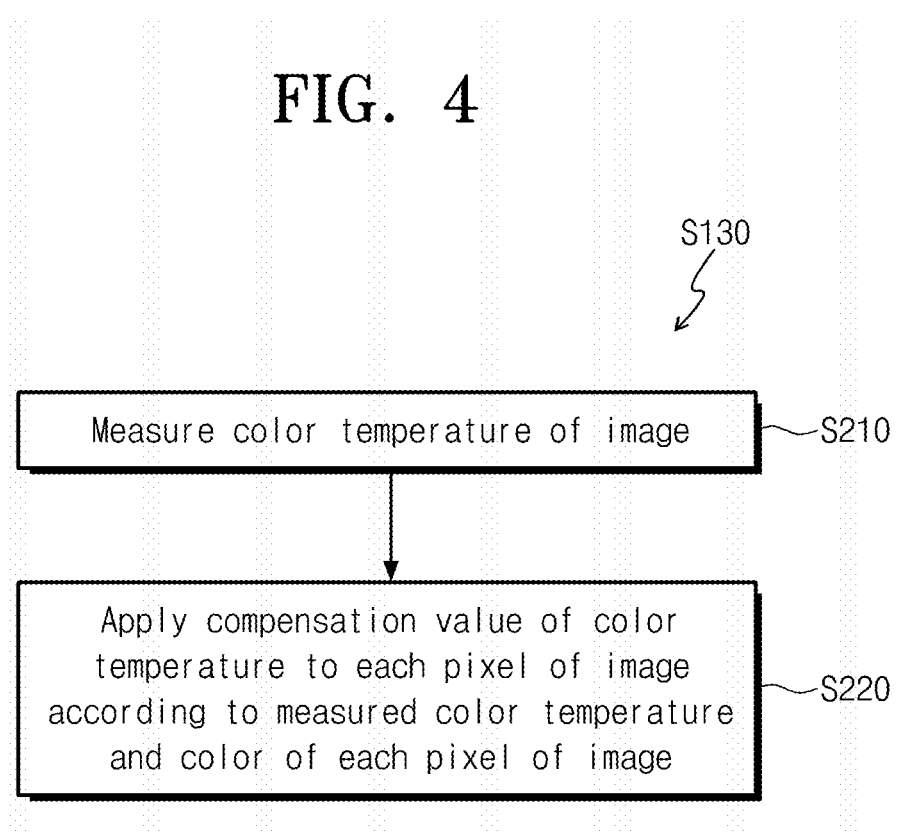
FIG. 4 is a flowchart illustrating operation S130 of FIG. 3 in accordance with an exemplary embodiment.

FIG. 4 is a flowchart illustrating operation S130 of FIG. 3 in accordance with an exemplary embodiment.

Referring to FIGS. 1 through 4, operation S130 includes operations S210 and S220.

In operation S210, a color temperature of an image is measured. Operation S210 may be performed in the color temperature compensation part 300.

In operation S220, a compensation value of the color temperature may be applied to each pixel of the image according to a color temperature of the measured image and a color of each pixel of the image. In Operation S220, a color temperature of a measured image and a color temperature compensation value corresponding to a color of each pixel of the image are read out from the LUT 500, and the read out color temperature compensation value is applied to each pixel.

Figure 5:
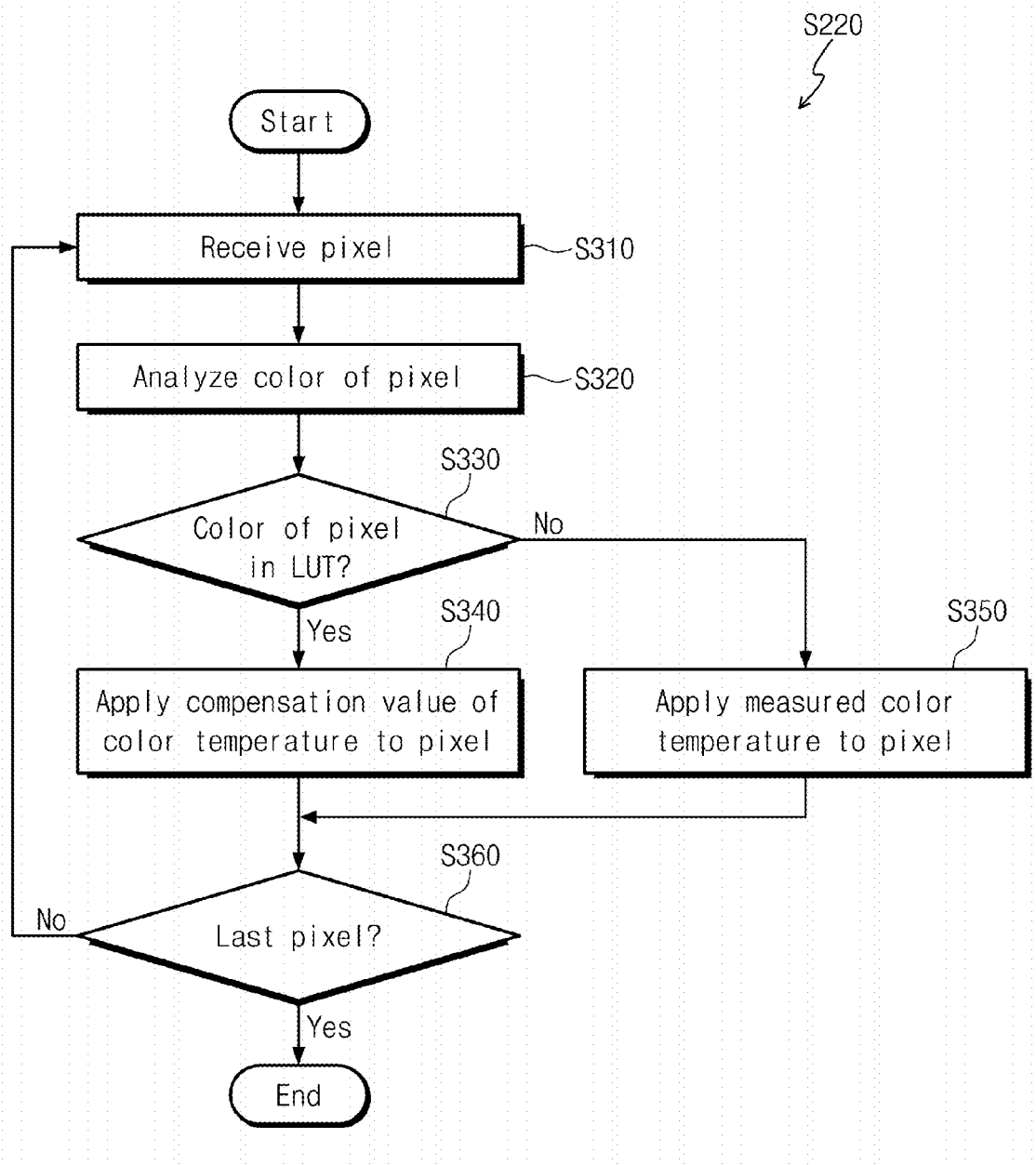
FIG. 5 is a flowchart illustrating operation S220 of FIG. 4 in accordance with an exemplary embodiment.

FIG. 5 is a flowchart illustrating operation S220 of FIG. 4 in accordance with an exemplary embodiment.

Referring to FIGS. 1 through 5, operation S220 includes operations S310 through S360.

In operation S310, an image is received by a pixel unit. In operation S320, a color of an input pixel among pixels included in the image is analyzed. Then, a color of the analyzed input pixel is checked in the LUT 500 (S330). If the number of colors stored in the LUT 500 is increased, more accurate color temperature compensation is possible but a memory capacity occupied by the LUT 500 needs to increase. Thus, the LUT 500 may not store color temperature compensation values with respect to all of possible colors that exist in the natural world.

In operation S330, if a color of the analyzed input pixel exists in the LUT 500, the procedure proceeds to operation S340. In operation S340, a color temperature compensation value corresponding to the analyzed color of the input pixel and the measured color temperature of the image are applied to the input pixel. The color temperature of the input pixel may be determined as a value obtained by compensating the color temperature of the measured image with the color temperature compensation value.

In operation S330, if the color of the analyzed input pixel does not exist in the LUT 500, the procedure proceeds to operation S350. In operation S350, the color temperature of the measured image is determined as a color temperature of the input pixel.

Next, in operation S360, it is determined whether the input pixel is the last pixel among the pixels included in the image. If the input pixel is the last pixel among the pixels included in the image, operation S220 is finished. If the input pixel is not the last pixel among the pixels making an image, the procedure proceeds to operation S310 to repeat operations S310 through S360. That is, another pixel among the pixels included in the image is received and a color temperature compensation is performed with respect to the received pixel.

Figure 6:
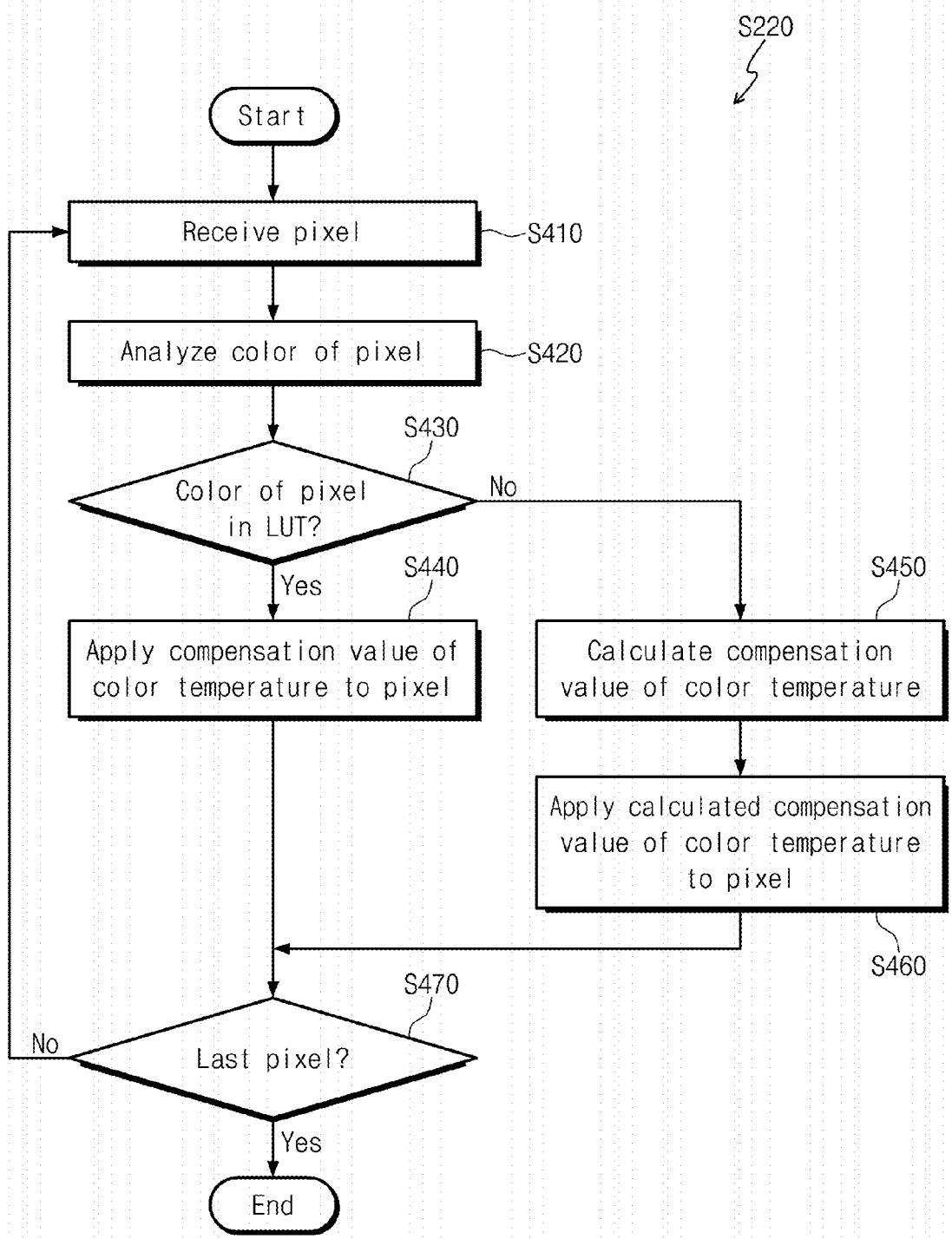
FIG. 6 is a flowchart illustrating operation S220 of FIG. 4 in accordance with another exemplary embodiment.

FIG. 6 is a flowchart illustrating operation S220 of FIG. 4 in accordance with another exemplary embodiment.

Referring to FIGS. 1 through 4 and 6, operation S220 includes operations S410 through S470.

Since operations S410 through S440 and operation S470 illustrated in FIG. 6 are substantially the same as operations S340 through S360, a detailed description thereof is omitted.

In operation S430, if the color of the analyzed input pixel does not exist in the LUT 500, the procedure proceeds to operation S450. In operation S450, a color temperature compensation value with respect to the color of the analyzed input pixel is calculated. Operation S450 will be described further in detail with reference to FIG. 7.

In operation S460, the calculated color temperature compensation value is applied to the input pixel. A color temperature of the input pixel may be determined as a value obtained by compensating a color temperature of the measured image based on the calculated color temperature compensation value.

Figure 7:
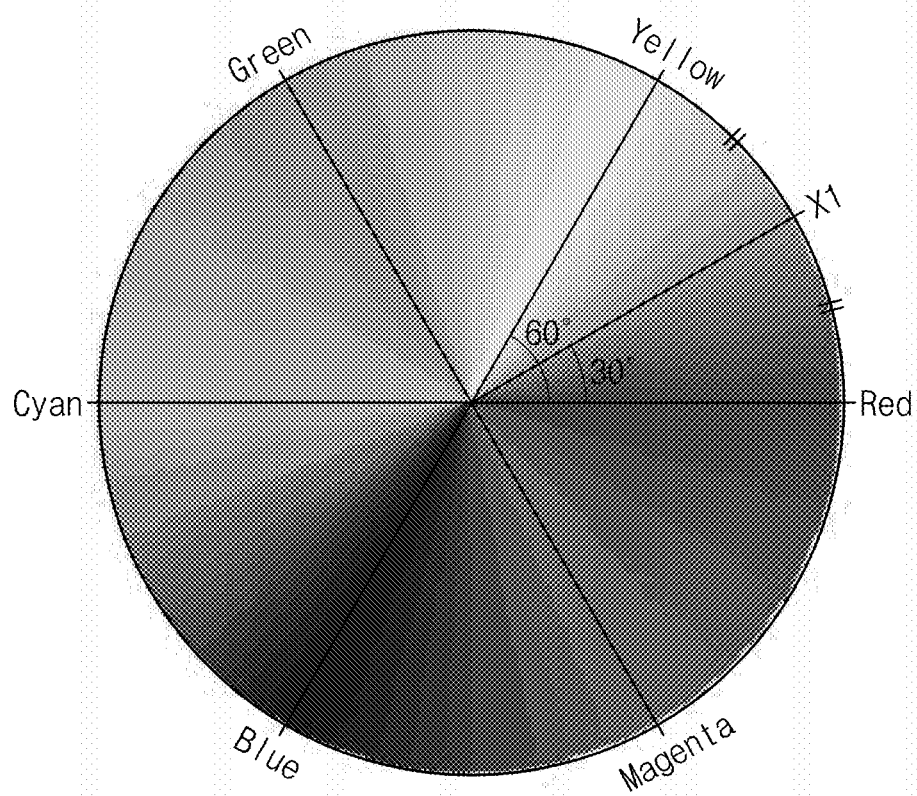
FIG. 7 is a drawing illustrating a circular color space.

FIG. 7 is a drawing illustrating a circular color space. In FIG. 7, six typical colors are represented for illustrative purposes. The typical colors may include red, yellow, green, cyan, blue, and magenta. In FIG. 7, red is set to 0°, and yellow, green, cyan, blue and magenta are sequentially represented with every 60° of angle increase in a counterclockwise direction from the red.

It is assumed that a color temperature compensation value according to the typical colors illustrated in FIG. 7 is stored in the LUT 500 of FIGS. 1 and 2. That is, a color temperature compensation value according to red, yellow, green, cyan, blue, and magenta may be stored in the LUT 500. However, a color temperature compensation value according to colors other than the typical colors may not be stored in the LUT 500. For example, a color temperature compensation value according to a color X1 of an input pixel may not be stored in the LUT 500.

The color temperature compensation value according to the color X1 of the input pixel may be calculated based on color temperature compensation values of two typical colors stored in the LUT 500 and based on a location of the color X1 of the input pixel between two typical colors. The color X1 of the input pixel is positioned between the two typical colors. That is, a value corresponding to the location of the color X1 of the input pixel between two typical colors is calculated from the color temperature compensation values of the two typical colors. The location of the color X1 of the input pixel between two typical colors is determined through a distance between the color X1 of the input pixel and the two typical colors or an angle of the color X1 of the input pixel with respect to the two typical colors.

The color temperature compensation value according to the color X1 of the measured input pixel is determined as a value among the color temperature compensation values of the two typical colors.

It is assumed that the color X1 of the input pixel is a color between red and yellow. It is also assumed that a color temperature of a measured image is within a range of 4000 K~5000 K. A distance between red and the color X1 of the input pixel may be the same as a distance between yellow and color X1 of the input pixel. That is, the color X1 of the input pixel may be set to 30° in the color space of FIG. 7.

Referring to FIGS. 2 and 7, the color temperature compensation value of the color X1 of the input pixel may have a value corresponding to an intermediate value between 100 K which is a color temperature compensation value when the color of the input pixel X1 is red and −100 K which is a color temperature compensation value when the color of the input pixel X1 is yellow. Thus, the color temperature compensation value of the color X1 of the input pixel may be calculated as 0 K.

FIG. 8 is a drawing illustrating a look up table of FIG. 1 in accordance with another exemplary embodiment.

Referring to FIGS. 1 and 8, a look up table (LUT) 510 can further store various conditions or factors to set a color temperature compensation value compared with the LUT 500 of FIG. 2. The LUT 510 can store a color temperature of an image, a color of each pixel, information on whether an image is shot indoors or outdoors, and a color temperature compensation value according to brightness of an environment in which an image is measured.

Thus, according to an image processing method of an image signal processing device including the LUT 510 of FIG. 8, more accurate color temperature compensation is possible and thereby a color reproduction rate of an image shot can be increased.

Figure 9:
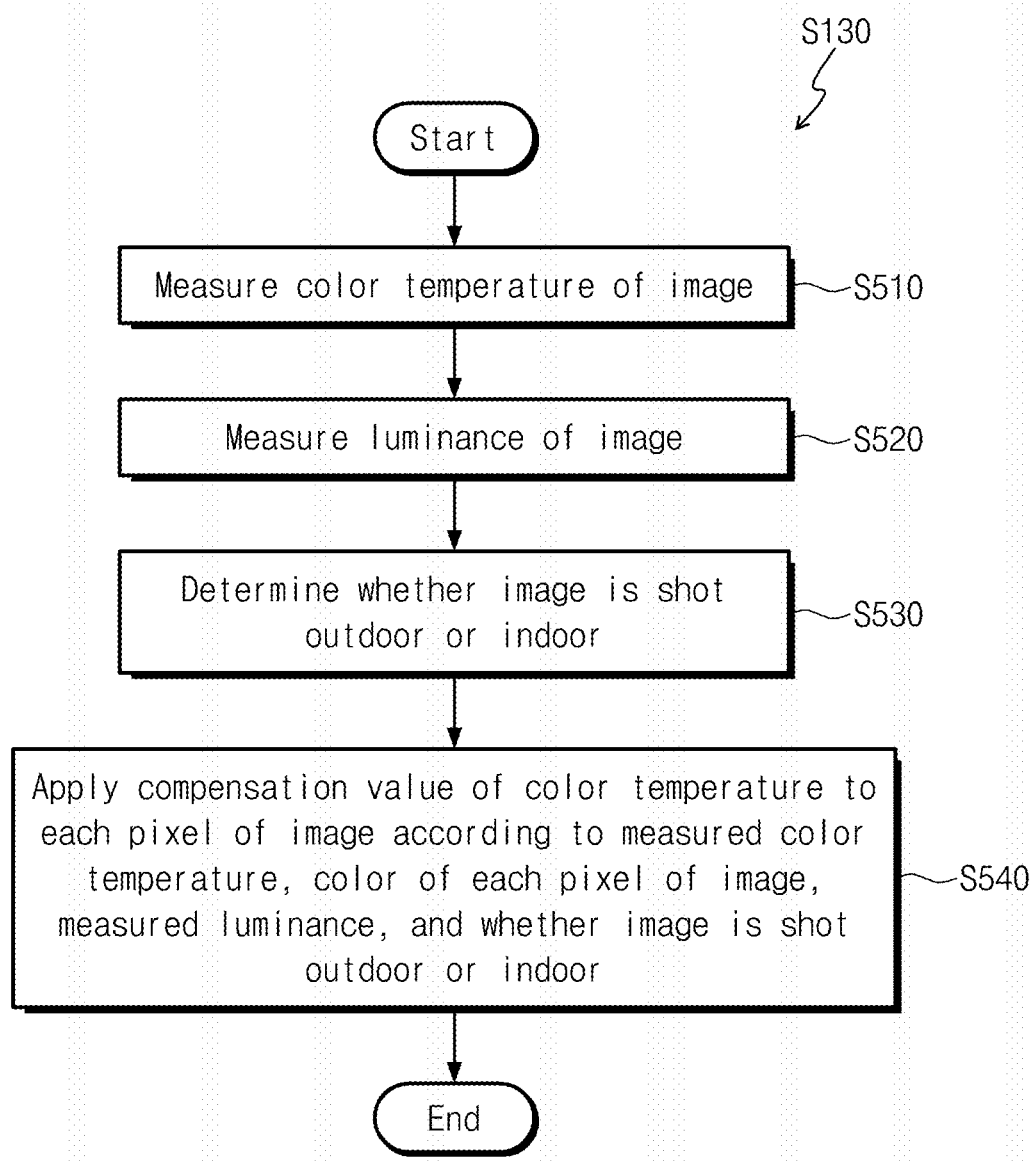
FIG. 9 is a flowchart illustrating operation S130 of FIG. 3 in accordance with another exemplary embodiment.

FIG. 9 is a flowchart illustrating operation S130 of FIG. 3 in accordance with another exemplary embodiment.

Referring to FIGS. 1, 3, 8 and 9, operation S130 includes operations S510 through S540.

In operation S510, a color temperature of an image is measured. Operation S510 may be performed in the color temperature measurement part 300.

In operation S520, brightness of the image is measured. Brightness of an environment in which the image is measured can be determined through the measured brightness of the image. In operation S530, it is determined whether the image is measured (or captured) indoors or outdoors. Operation S530 can be determined through a wavelength spectrum and/or brightness of the measured image.

In operation S540, a color temperature compensation value may be applied to each pixel of an image according to a color temperature of the measured image, a color of each pixel of the image, brightness of the measured image and/or whether the image is shot indoors or outdoors. Operation S540 may be performed in the white balance part 400. In operation S540, a color temperature compensation value corresponding to a color temperature of the measured image, a color of each pixel of the image, brightness of the measured image, and/or whether the image is shot indoors or outdoors is read out from the LUT 510, and the color temperature compensation value that is read out may be applied to a corresponding pixel.

Figure 10:
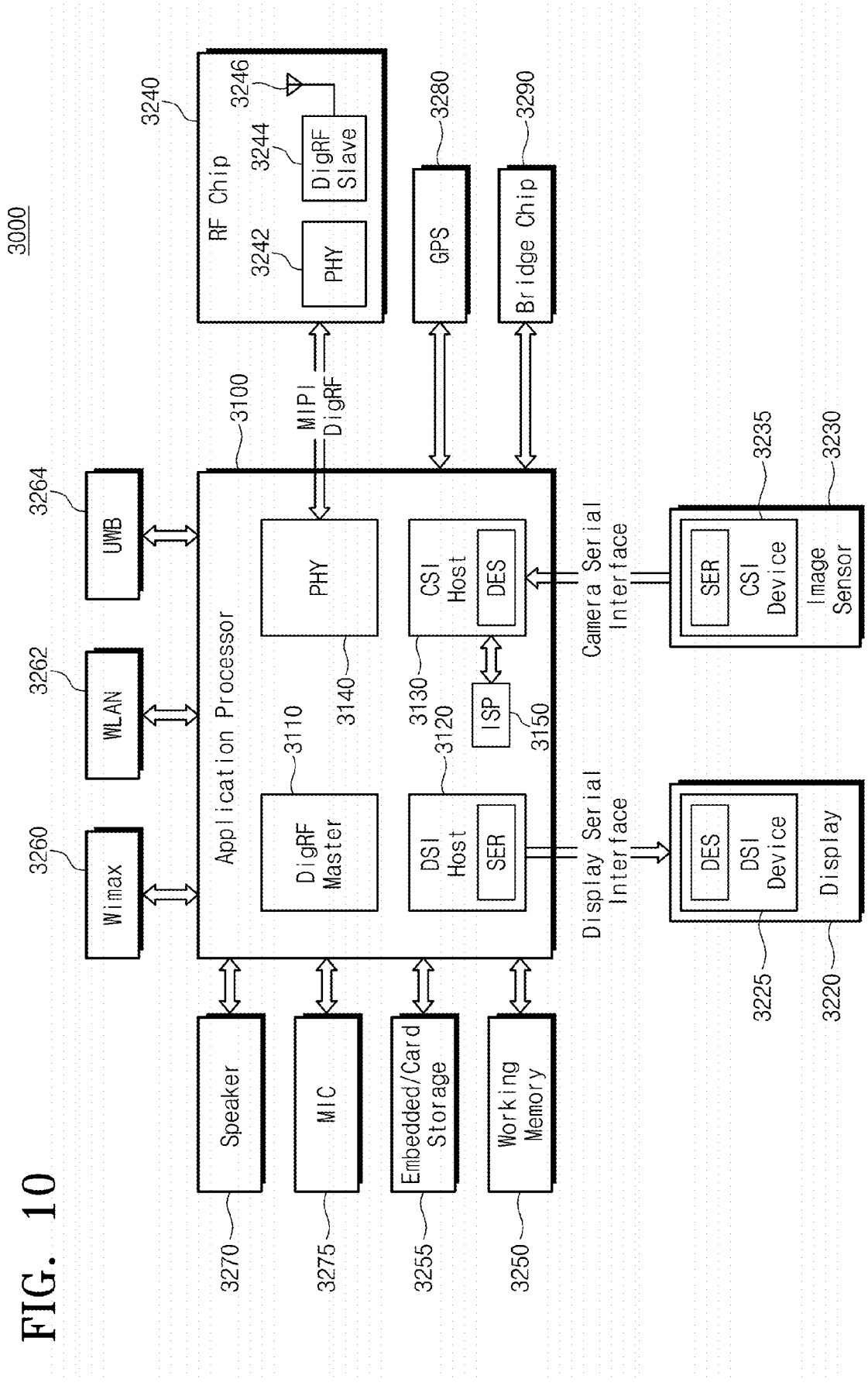
FIG. 10 is a block diagram illustrating an electronic system including an image signal processing device in accordance with an exemplary embodiment.
Figure 11:
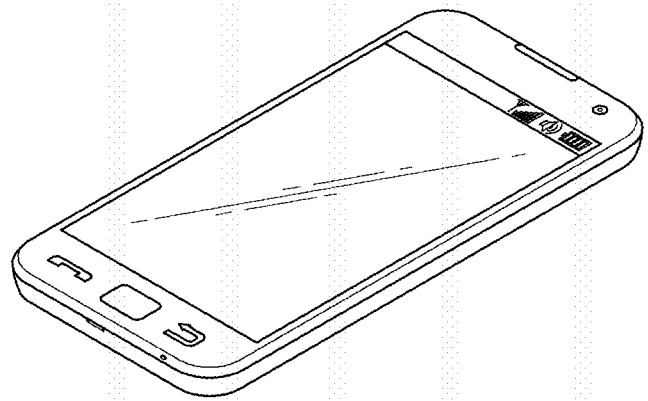
FIGS. 11 through 15 illustrate examples of a multimedia device including an electronic system in accordance with exemplary embodiments.
Figure 12:
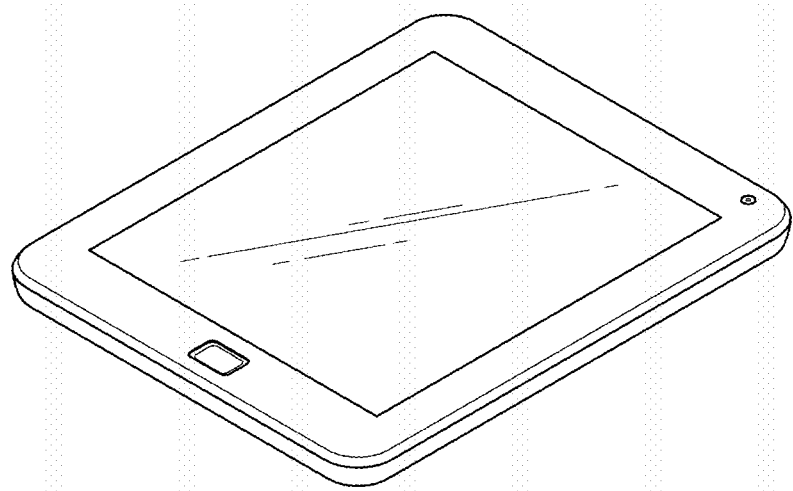
Figure 13:
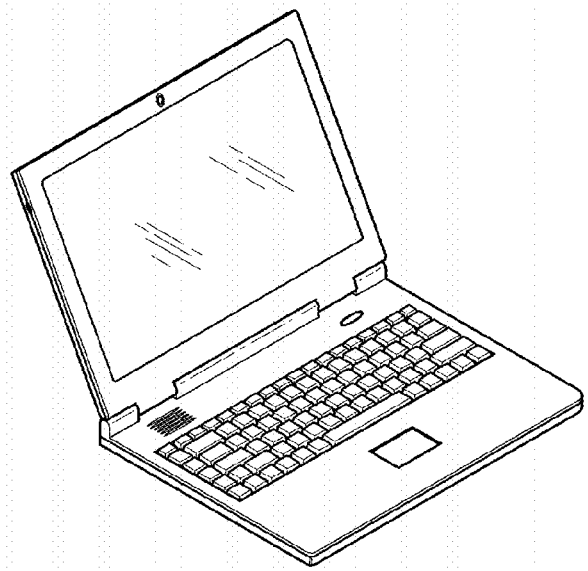
Figure 14:
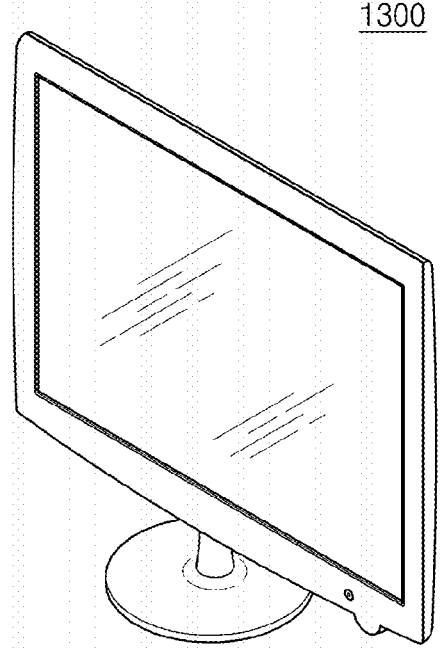
Figure 15:
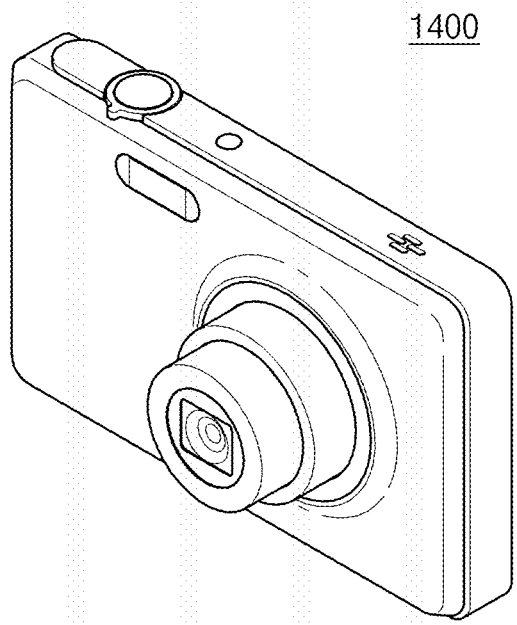

FIG. 10 is a block diagram illustrating an electronic system including an image signal processing device in accordance with an exemplary embodiment. An electronic system 3000 may be embodied by a data processing device capable of using or supporting an interface suggested by a mobile industry processor interface (MIPI) alliance. For example, the electronic system 3000 may be embodied by a portable communication terminal, a personal digital assistant (PDA), a portable media player (PMP), a smart phone, or a wearable device.

The electronic system 3000 may include an application processor 3100, a display 3220, and an image sensor 3230. The application processor 3100 may include a DigRF master 3110, a display serial interface (DSI) host 3120, a camera serial interface (CSI) host 3130, a physical hierarchy (PHY) 3140, and an image signal processing device 3150.

The DSI host 3120 can communicate with a DSI device 3225 of the display 3220 according to the DSI. For example, an optical serializer SER may be embodied in the DSI host 3120. Also, for example, an optical deserializer DES may be embodied in the DSI device 3225.

The CSI host 3130 can communicate with a CSI device 3235 of the image sensor 3230 according to the CSI. For example, an optical deserializer DES may be embodied in the CSI host 3130. Also, for example, an optical serializer SER may be embodied in the CSI device 3235.

The image signal processing device 3150 can communicate with the CSI host 3130 through a memory (for instance, a working memory 3250 or the application processor 3100) and a bus. The image signal processing device 3150 can apply a color temperature compensation value according to color to all of the pixels of the image.

In FIG. 10, the application processor 3100 includes the image signal processing device 3150. However, in an alternative exemplary embodiment, at least a portion of the image signal processing device 3150 may be included in the image sensor 3230. In this case, the image sensor 3230 can apply a color temperature compensation value to all of the pixels of the image.

The electronic system 3000 can further include a radio frequency (RF) chip 3240 that communicates with the application processor 3100. The RF chip 3240 may include a physical hierarchy (PHY) 3242, a DigRF slave 3244, and an antenna 3246. For example, the PHY 3242 of the RF chip 3240 and the PHY 3140 of the application processor 3100 can exchange data with each other by a DigFRF interface suggested by the MIPI alliance.

The electronic system 3000 may further include a working memory 3250 and an embedded/card storage 3255. The working memory 3250 and the embedded/card storage 3255 can store data provided from the application processor 3100. Further, data stored in the working memory 3250 and the embedded/card storage 3255 may be provided to the application processor 3100.

The working memory 3250 can temporarily store data processed or to be processed by the application processor 3100. The working memory 3250 may include a volatile memory such as a static random access memory (SRAM), a dynamic random access memory (DRAM), a synchronous dynamic random access memory (SDRAM), etc. or a non-volatile memory such as a flash memory, a parameter random access memory (PRAM), a magnetoresistive random access memory (MRAM), a resistive random access memory (ReRAM), a ferroelectric random access memory (FRAM), etc. The embedded/card storage 3255 can store data regardless of whether power supply is supplied.

The electronic system 3000 can communicate with an external system through a communication module (or communicator) such as world interoperability for microwave access (Wimax) 3260, a wireless local area network (WLAN) 3262, an ultra wideband (UWB) 3264, etc. The electronic system 3000 may further include a speaker 3270 and a microphone 3275 for processing voice information. The electronic system 3000 may further include a global positioning system (GPS) device 3280 for processing location information. The electronic system 3000 may further include a bridge chip 3290 for managing a connection to peripheral devices.

FIGS. 11 through 15 illustrate examples of a multimedia device including an electronic system in accordance with an exemplary embodiment.

The image signal processing device in accordance with an exemplary embodiment may be applied to various multimedia devices including an image processing function. For example, the image signal processing device in accordance with an exemplary embodiment may be applied to a mobile phone or smart phone 1000, a tablet or smart tablet 1100, a notebook computer 1200, a television or smart television 1300 and a digital camera or digital camcorder 1400 as illustrated in FIGS. 11 through 15 respectively.

According to an electronic system and an image processing method in accordance with exemplary embodiments, a color reproduction rate of an image can be increased by compensating a suitable color temperature in accordance with color at each pixel.

At least one of the components, elements or units represented by a block as illustrated in FIGS. 1 and 10 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. An image processing method comprising:
   receiving an image comprising a plurality of pixels;
   compensating a color temperature of at least one pixel of the image according to a color of the at least one pixel; and
   outputting the image according to a result of the compensating,
   wherein the compensating comprises:
      measuring a color temperature of the at least one pixel; and
      applying a color temperature compensation value to the at least one pixel based on the measured color temperature and the color of the at least one pixel, and
   wherein the applying comprises:
      analyzing the color of the at least one pixel;
      determining whether the color of the at least one pixel exists in a look up table; and
      in response to determining that the color of the at least one pixel exists in the look up table, determining the color temperature compensation value corresponding to the color and the measured color temperature of the at least one pixel by using the look up table and applying the determined color temperature compensation value to the at least one pixel.

2. The image processing method of claim 1, wherein the color temperature of the at least one pixel is determined as a value obtained by compensating the measured color temperature of the at least one pixel based on the color temperature compensation value.

3. The image processing method of claim 1, wherein the applying the color temperature compensation value further comprises:
   in response to determining that the color of the at least one pixel does not exist in the look up table, determining the measured color temperature of the at least one pixel as the color temperature of the at least one pixel.

4. The image processing method of claim 1, wherein the applying the color temperature compensation value further comprises:
   in response to determining that the color of the at least one pixel does not exist in the look up table, calculating the color temperature compensation value corresponding to the color of the at least one pixel; and
   applying the calculated color temperature compensation value to the at least one pixel.

5. The image processing method of claim 4, wherein the calculating comprises calculating the color temperature compensation value based on color temperature compensation values of at least two colors stored in the look up table and based on a location of the color of the at least one pixel with respect to the at least two colors stored in the look up table.

6. The image processing method of claim 5, wherein in response to determining that the color of the at least one pixel does not exist in the look up table, the color temperature compensation value corresponding to the color of the at least one pixel is determined based on the color temperature compensation values of the at least two colors stored in the look up table.

7. The image processing method of claim 1, wherein the applying the color temperature compensation value further comprises:
   determining whether the at least one pixel is a last pixel among the plurality of pixels of the image, and
   in response to determining that the at least one pixel is not the last pixel, receiving another pixel among the plurality of pixels of the image and compensating a color temperature of the another pixel according to a color of the another pixel.

8. The image processing method of claim 1, wherein the compensating further comprises performing at least one of:
   measuring brightness of the at least one pixel; and
   determining whether the image is captured indoors or outdoors.

9. The image processing method of claim 8, wherein the applying the color temperature compensation value comprises applying the color temperature compensation value to the at least one pixel based on at least one from among the measured color temperature of the at least one pixel, the color of the at least one pixel, the measured brightness of the at least one pixel, and whether the image is captured indoors or outdoors.

10. The image processing method of claim 1, further comprising:
    prior to performing the compensating, performing a pre-processing operation on the image; and
    after performing the compensating, performing a post-processing operation on the image.

11. The image processing method of claim 1, wherein the color temperature compensation value varies according to the measured color temperature and the color of the at least one pixel.

12. An electronic system comprising:
    a camera configured to capture an image comprising a plurality of pixels;
    a color temperature measurer configured to measure a color temperature of at least one pixel of the image;
    a look up table configured to store a color temperature compensation value for adjusting the color temperature, according to the color temperature and a color of the at least one pixel; and
    a white balance adjuster configured to read out the color temperature compensation value corresponding to the measured color temperature and the color of the at least one pixel from the look up table to compensate the color temperature of the at least one pixel of the image.

13. The electronic system of claim 12, wherein the white balance adjuster is further configured to apply the color temperature compensation value to the at least one pixel of the image.

14. The electronic system of claim 12, wherein the look up table is further configured to store the color temperature compensation value based on at least one of brightness of an environment in which the image is measured and whether the image is captured indoors or outdoors.

15. The electronic system of claim 14, wherein the white balance adjuster is further configured to compensate the color temperature of the at least one pixel of the image based on the at least one of the brightness of the environment in which the image is measured and whether the image is captured indoors or outdoors, by using the look up table.

16. An image signal processing apparatus comprising:
- a preprocessing module configured to perform a preprocessing operation on an image;
- a color temperature measurer configured to measure a color temperature of at least one pixel of the image;
- a look up table configured to store a color temperature compensation value for adjusting the color temperature, according to the color temperature and a color of the at least one pixel;
- a white balance adjuster configured to read out the color temperature compensation value corresponding to the measured color temperature and the color of the at least one pixel from the look up table to compensate the color temperature of the at least one pixel of the image; and
- a post-processing module configured to perform a post-processing operation on the image of which the color temperature of the at least one pixel is compensated.

17. The image signal processing apparatus of claim 16, wherein the white balance adjuster is further configured to correct a white balance of the at least one pixel by using the look up table.

18. The image signal processing apparatus of claim 16 wherein the white balance adjuster is further configured to apply the color temperature compensation value to the at least one pixel of the image.

19. The image signal processing apparatus of claim 16, wherein the white balance adjuster is further configured to compensate the color temperature of the at least one pixel of the image based on brightness of the at least one pixel.

* * * * *